(No Model.)
H. W. F. BÜTTNER.
ARTIFICIAL TOOTH.
No. 245,782. Patented Aug. 16, 1881.
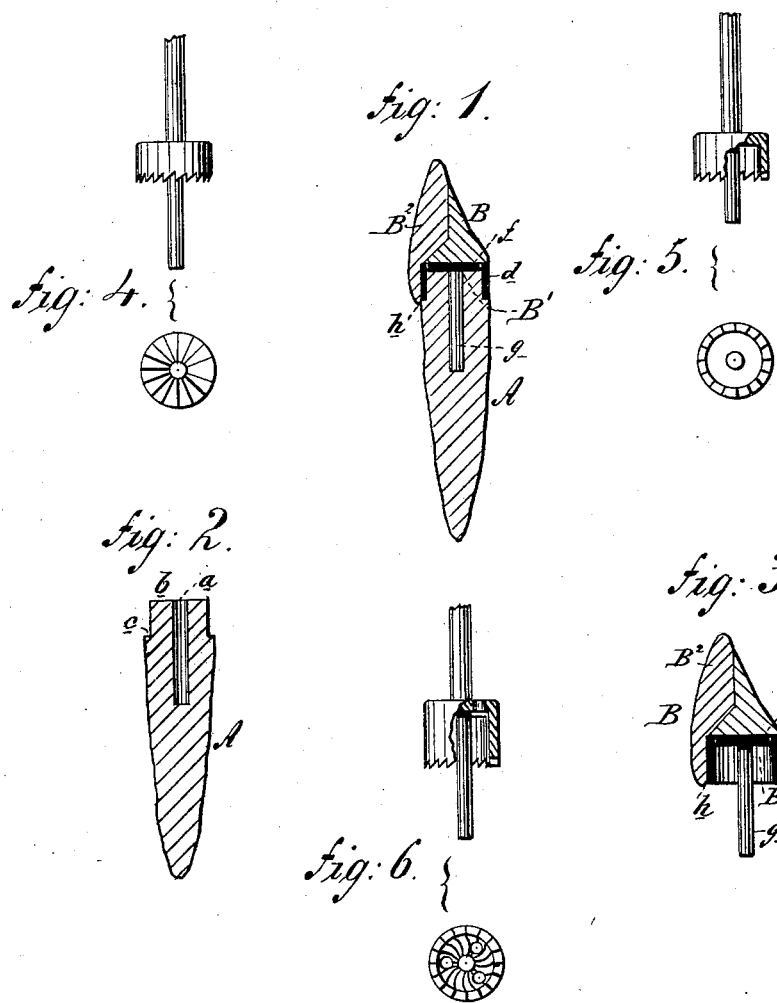
WITNESSES:
A. Schehl.
C. Sedgwick
INVENTOR:
H. W. F. Büttner
BY Munn & Co
ATTORNEYS.

UNITED STATES PATENT OFFICE.

HENRY W. F. BÜTTNER, OF NEW YORK, N. Y.

ARTIFICIAL TOOTH.

SPECIFICATION forming part of Letters Patent No. 245,782, dated August 16, 1881.

Application filed February 3, 1881. (No model.)

*To all whom it may concern:*

Be it known that I, HENRY W. F. BÜTTNER, of the city, county, and State of New York, have invented a new and Improved Artificial Tooth-Crown and Process of Setting the Same, of which the following is a full, clear, and exact description.

There are various methods of pivoting the natural roots of human teeth, but they fail or are defective in the matters of strength and firmness and in preventing the decay of the root.

The object of this invention is to overcome these objections.

The invention consists in turning down the upper end of the tooth-root, so as to form a circular shoulder thereon, the irregular upper surface of the tooth being cut off in a horizontal plane to accurately fit the metallic cap which carries the artificial crown; and it further consists of a metallic cap composed of a ring, circular plate, and central pivot, the ring fitting upon the shoulder of the root, the pivot tightly fitting into the central hole made in the root, and the plate fitting closely and air-tight upon the plane upper surface of the root and uniting the ring and pivot; and the process consists in enlarging the nerve-canal of the tooth-root with a suitable tool, in then cutting off the upper surface of the root on a perfect level, and in then cutting away the walls of the root to form a circular shoulder thereon. A cap is then prepared to fit the root, and has an artificial crown suitably attached to it, and is then fitted upon the top of the said root and forced down thereon, so that the pivot shall enter the central hole, the ring encircle the shoulder, and the plate fit closely on the plane top.

Figure 1 is a vertical sectional elevation, showing my improved tooth-crown applied to a tooth-root. Fig. 2 is a vertical sectional elevation of a tooth-root prepared according to my improved method. Fig. 3 is a sectional elevation of my improved tooth-crown. Fig. 4 represents an elevation and a plan of the reverse of an improved tool for cutting off the surface of the root. Fig. 5 represents an elevation with parts broken away to exhibit other parts, and a plan of the reverse of an improved tool for forming the shoulder on the tooth-root. Fig. 6 represents an elevation with parts broken away to exhibit other parts, and a plan of the reverse of an improved tool for simultaneously cutting off the top and forming the shoulder on the tooth-root. Fig. 7 is a perspective view of the cap connecting the crown with the root.

Similar letters of reference indicate corresponding parts.

In the drawings, A represents the root of a tooth having its nerve-channel bored out, as shown at $a$, by a suitable drill, its upper surface cut off on a level plane, as shown at $b$, preferably by a tool represented in Fig. 4, the spindle of said tool being inserted into the bore $a$ of the tooth-root A to steady the said tool in its work, and the upper end of the root A has its walls cut away, preferably by a trephining-tool represented in Fig. 5, whereby a circular shoulder, $c$, is formed, the lower end of the said tool-spindle being inserted in the bore $a$ of the tooth-root for convenience of working said tool. It will be seen that in cutting or forming this plane $b$ and shoulder $c$ I change the irregular shape of the end of the tooth-root A to a regular shape, so that the artificial crown B can be fitted securely and air-tight upon said root A, thereby protecting said root from decay, and the surrounding tissues from inflammation, by leaving no space between the crown B and root A for the deposition of organic matters, and thereby making it easy, also, to secure the artificial crown B more firmly than can be done when the tooth-root A is left with its natural irregular surfaces.

The crown B consists of the cap B' and artificial tooth B². The cap B' is formed of a metallic ring, $d$, within which is secured a circular horizontal plate, $f$, from the center of which a pivot or spindle, $g$, projects downward.

The tooth B² is one of the ordinary kind cut away on its under face, as indicated at $h$, to fit over and upon the periphery of the ring $d$ and hide it from view on that front, said tooth B² being then united in the ordinary manner with solder to the cap B'. The said crown B is fixed upon the root A by inserting the spindle or pivot $g$ into the bore $a$, and by then driving said crown B down into place by repeated blows of a mallet.

Though I prefer the method herein set forth for uniting an artificial tooth-crown to a tooth-root, I do not confine myself to it, as I find it possible to put artificial crowns on roots without destroying the root-nerve, in which case I do not bore the tooth-root nor provide the tooth-cap with a pivot or spindle, but make a cap consisting only of the ring $d$ and horizontal plate $f$, which cap, when fitted closely on the tooth-root, holds the crown very securely on the said root.

I am aware that processes somewhat resembling mine have been practiced, but, in none of them is the tooth-root first prepared with smooth and regular surfaces, but, on the contrary, the natural outline of the root is preserved, so that it is difficult, if not impossible, to fit an artificial crown onto the said root so closely that organic matter cannot lodge in the joint and cause decay and inflammation, nor in such processes can the crown be so invariably secured with proper firmness and strength as by the improved process herein set forth.

In lieu of the tools shown in Figs. 4 and 5, I sometimes use, in preparing the tooth-root, an improved tool combining the advantages of both, said tool serving to form the plane on the upper surface of the root, and at the same time to form the circular shoulder for the ring to fit upon, as shown in Fig. 6.

I am aware that artificial teeth-crowns have been connected with the natural tooth or root by a screw which passes through the said crown into the metallic base of the root; but

What I claim as new, and of my invention, is—

1. The improved process, substantially as herein described, of setting artificial tooth-crowns, which consists in forming a horizontal plane and circular shoulder on the top of the root, and fitting the crown thereto by means of a horizontal plate and its inclosing-ring, to which the crown is connected, said plate being fitted closely on the horizontal plane, and the ring about the circular shoulder formed on said tooth-root, as set forth.

2. The combination, with the tooth-root A, having a horizontal surface plane, $b$, and annular shoulder $c$, of the cap B', composed of ring $d$, plate $f$, and spindle $g$, substantially as herein shown and described.

HENRY W. F. BÜTTNER.

Witnesses:
J. J. STORER,
C. SEDGWICK.